March 1, 1949.  H. W. CARDWELL ET AL  2,462,944
AXIALLY ENGAGEABLE FRICTION CLUTCH
Filed Oct. 11, 1943  9 Sheets-Sheet 1

Fig. 10.

March 1, 1949. H. W. CARDWELL ET AL 2,462,944
AXIALLY ENGAGEABLE FRICTION CLUTCH
Filed Oct. 11, 1943 9 Sheets-Sheet 8

Inventors
Harland W. Cardwell
Gerald G. Brown and
Earl R. Johnson
Bacon & Thomas Attorneys Patented Mar. 1, 1949

2,462,944

UNITED STATES PATENT OFFICE 2,462,944

AXIALLY ENGAGEABLE FRICTION CLUTCH

Harland W. Cardwell, Gerald G. Brown, and Earl R. Johnson, Wichita, Kans., assignors to Cardwell Manufacturing Company, Inc., Wichita, Kans.

Application October 11, 1943, Serial No. 505,832

31 Claims. (Cl. 192—68)

The present invention relates to friction clutches of the disc type and more particularly to improved means for effecting engagement and disengagement thereof.

Clutches constructed in accordance with the principles of the present invention may be either manually operated, or fluid operated by air or liquid under pressure.

One of the principal objects of the invention is to provide a clutch construction including a means for effecting operation of the clutch which has a minimum of axial movement and length, thereby imparting compactness to the device.

Another object of the invention is to provide a clutch construction in which the sleeve for effecting engagement of the clutch is moved axially away from the backing plate, instead of toward said backing plate, and in which the axial length of said sleeve is considerably less than in prior known clutch actuating mechanisms.

Another object of the invention is to provide a clutch construction in which the elements can be quickly engaged or disengaged to provide a quick-acting clutch.

Another object of the invention is to provide an adjustable wear take-up means and improved locking means for maintaining said wear take-up means in any desired position of adjustment.

Another object of the invention is to provide a fluid operable clutch and an attachment for use with said clutch which, in the event of fluid pressure failure, can be operatively associated with the drive and driven clutch parts to effect a positive connection therebetween.

A further object of the invention is to provide a spring-loaded clutch arranged so that the spring continually tends to urge the clutch parts into driving engagement.

A still further object of the invention is to provide a spring-loaded clutch having spring means continuously tending to engage the same and also having means arranged to simultaneously effect disengagement thereof and apply a braking force to stop rotation of the driven element so that any gears of a transmission associated therewith can be shifted without clashing.

Other and further objects of the invention will be apparent from the following description taken in conjunction with the accompanying drawings, in which.

Figures 1, 2:
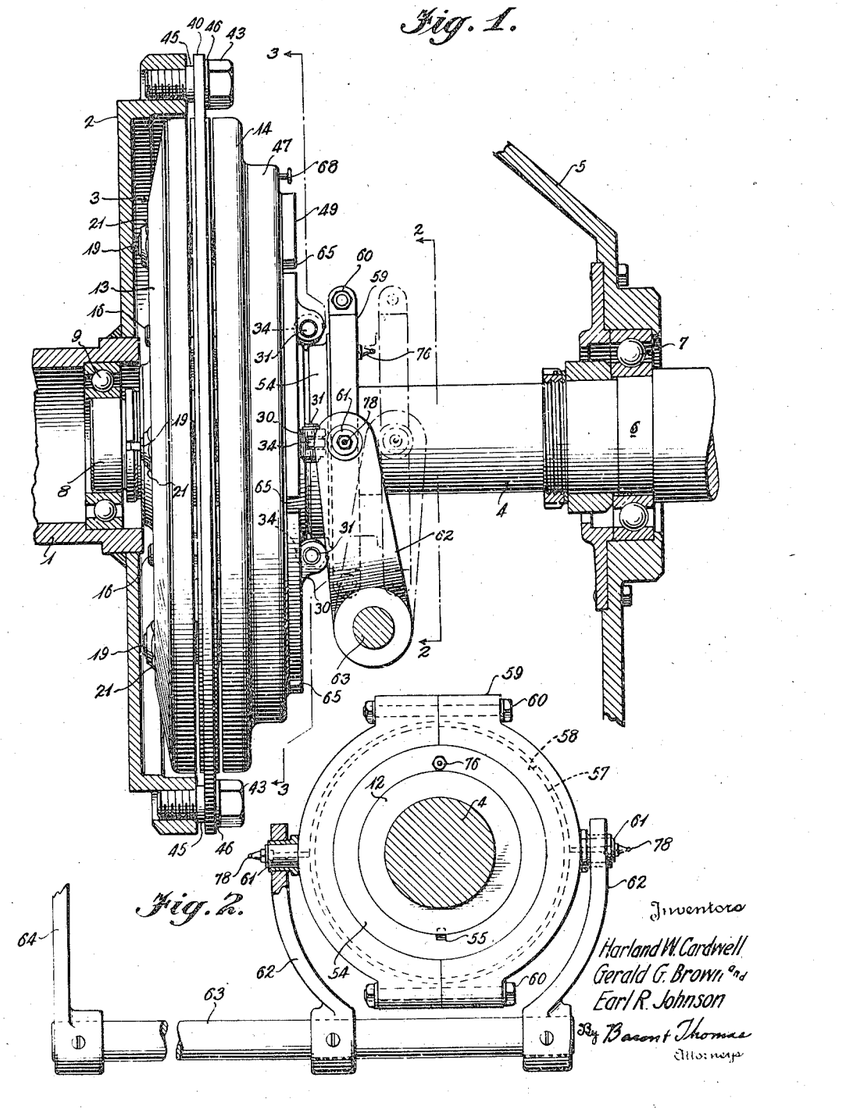
Fig. 1 is a view partly in elevation and partly in section of one form of clutch embodying the principles of the invention.
Fig. 2 is a sectional view taken on the line 2—2 of Fig. 1, illustrating certain details of the yoke mechanism associated with the clutch.
Figures 3, 7, 8:
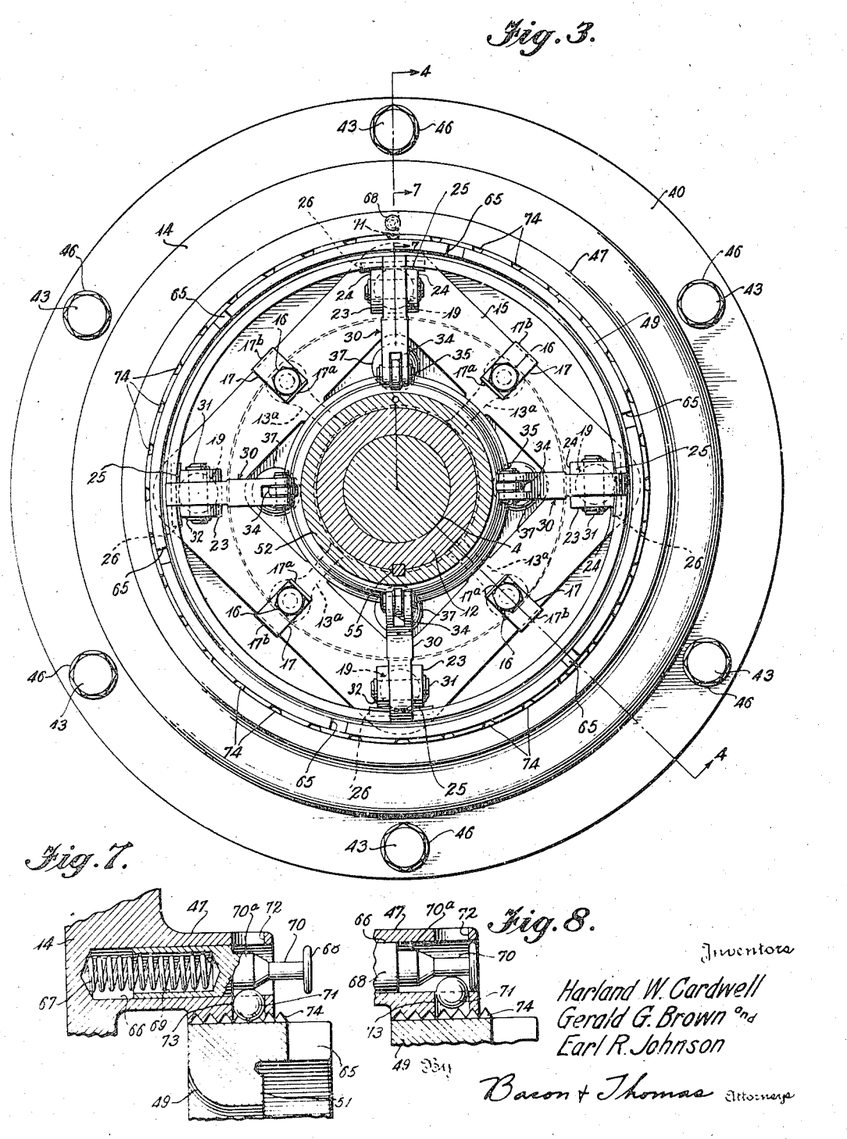
Fig. 3 is a face view of the clutch corresponding to a section taken on the line 3—3 of Fig. 1, particularly illustrating the arrangement of the radial levers employed to engage the clutch parts.
Fig. 7 is an enlarged sectional view of the locking means for the adjustable wear-take-up ring carried by the pressure plate, said section being taken on the line 7—7 of Fig. 3.
Fig. 8 is a similar view of the locking means, but showing the parts in the positions they assume to permit adjustment of the wear-take-up ring.
Figure 4:
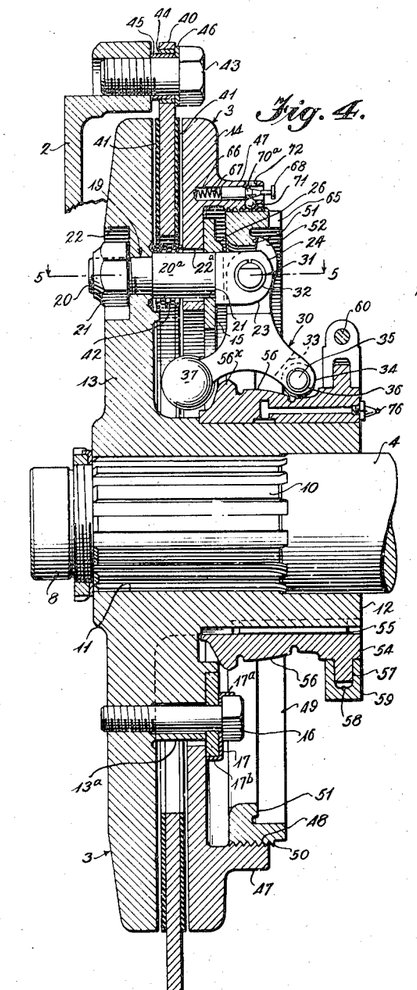
Fig. 4 is a vertical sectional view through the clutch taken on the line 4—4 of Fig. 3, and particularly illustrating the construction of one of the levers and the actuating sleeve associated therewith for effecting engagement of the clutch parts.

Referring now to Figs. 1 to 5, the numeral 1 generally indicates a member (which may be either a drive or driven member) carrying a flywheel or similar element 2. A clutch mechanism generally indicated by the numeral 3 is mounted on a shaft 4 in cooperating relation to the flywheel 2. The flywheel 2 and clutch mechanism 3 may be exposed or enclosed in a suitable housing 5, if desired, as will be readily understood. An intermediate portion 6 of the shaft 4 is supported by a ball-bearing 7 mounted in the housing 5 and one extremity 8 of said shaft is mounted in a ball-bearing 9 received in the member 1 and providing a support for one end of said member. The end 8 of the shaft 4 is provided with a series of splines 10 (Fig. 4). The splines 10 are received in a correspondingly splined portion 11 in a hub 12 formed integral with a backing plate 13. An annular pressure plate 14 and a hollow square tie-plate 15 are operatively associated and carried by the backing plate 13. The backing plate 13 carries four bosses 13a (Fig. 3) spaced 90° apart and the tie-plate 15 is fixedly clamped against said bosses by four cap screws 16, which extend through the tie-plate 15, bosses 13a, and are threaded into the backing plate 13 as best shown in Fig. 4. A small lock washer plate 17 is disposed radially under the head of each cap screw 16. One end 17a of the plate 17 is bent in one direction to engage a side of the head of the cap screw 16 and the other end 17b is bent in the opposite direction around an edge of the tie-plate 15, whereby to lock said cap screw against rotation.

The annular pressure plate 14 is supported for axial movement upon four eye bolts generally indicated by 19 fixed in the backing plate 13. Each of said bolts has a reduced end portion 20 extending through the backing plate 13. A conventional self-locking nut 21 is threaded upon each of the reduced portions 20 to fixedly mount the bolts 19 on the backing plate 13, the nuts 21 being received in recesses 22 formed in the outer face of said backing plate. Each of the bolts 19 includes an intermediate enlarged cylindrical portion 20a which extends through an opening 21 in the tie-plate 15 and an opening 22a in the pressure plate 14 and provides a shoulder abutting the inner face of the backing plate. The openings 22a are of such size that the pressure plate 14 is freely and slidably supported upon the bolts 19. Each of the bolts 19 is provided with an enlarged, generally square head 23 fashioned in the form of a clevis providing spaced apertured arms or ears 24. The radially outermost portion of the bolt heads 23 is ground or otherwise made arcuate at 25, as is best shown in Fig. 3. The tie-plate 15 primarily serves as a support for the head ends of the bolts 19 and is provided with an integral projection 26 which cooperates with the arcuate portion 25 to prevent said bolts from turning to thereby maintain the arms 24 in alignment with a radius passing through the axis of the shaft 4.

Figure 5:
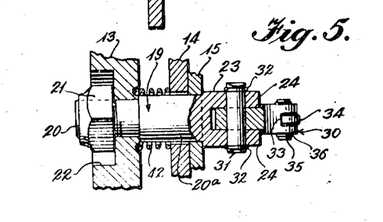
Fig. 5 is a sectional view taken on the line 5—5 of Fig. 4 illustrating the manner in which one of the levers is pivotally mounted relative to the backing plate.

A lever generally identified by the numeral 30 is pivotally mounted upon the arms 24 by a pin 31 extending therethrough and retained in place by split rings 32 mounted in said pin adjacent the outer sides of each of the arms 24 as best shown in Fig. 5. Each of the levers 30 is provided with a slot 33 at the lower end thereof to receive a roller 34. The roller 34 is mounted upon a pin 35 extending through the lever 33 and split rings 36 retain the pin in assembled relation with said lever. Each of the levers 30 carries a laterally offset enlargement 37, preferably in the form of a sphere which serves as a counterweight to counter-balance the roller-carrying end of the lever to maintain the same in the position shown in Fig. 4 when the clutch 3 is disengaged. When the clutch is engaged and rotating, the counterweights 37 counteract the centrifugal force of the rollers 34 to enable prompt disengagement of the clutch, as will be explained later. It will be noted from Fig. 3 that the square tie-plate 15 is so mounted on the backing plate 13 that the counterweights 37 are freely movable in the corner spaces of the square openings of said tie-plate.

The clutch shown in Figs. 1 to 5 includes a single clutch disc 40, but it will be understood that any suitable number of discs may be employed. The disc 40 is disposed between the backing plate 13 and the pressure plate 14. The disc 40 is preferably metallic and the opposite sides thereof are provided with a suitable friction facing material 41. A compression spring 42, surrounding the enlarged portion 20a of each of the bolts 19, serves to yieldably maintain the pressure plate 14 out of contact with said friction material when the clutch 3 is disengaged. The disc 40 is connected with the flywheel by suitable cap screws 43, six being shown in the present embodiment. Each of the cap screws 43 extends through an insert 44 in the clutch disc 40 and carries a spacer sleeve 45 received within said insert. One end of the spacer sleeve 45 engages the flywheel 2 and the other end of the said sleeve is engaged by a washer 46 arranged directly under the head of the cap screws 43. The clearance between the insert 44 and the spacer 45 is such that the disc 40 can readily slide upon said spacer to the extent necessary.

The pressure plate 14 is provided with an axially extending flange 47 which is internally threaded as indicated at 48 (Fig. 4). An adjustable wear take-up ring 49 is provided with external threads 50 adapted to engage with the threads 48. The adjustment ring 49 is also provided with a plain annular internal shoulder or surface 51 adapted to be engaged by the outer end 52 of the levers 30.

Figure 6:
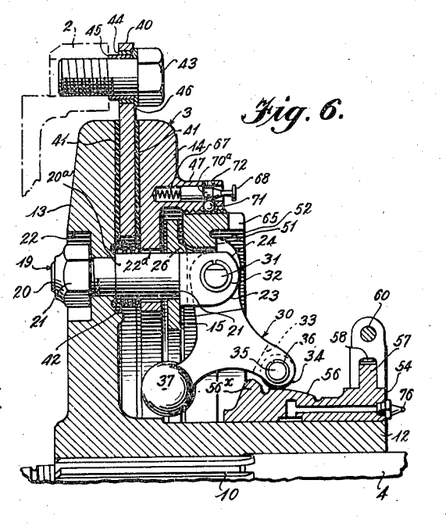
Fig. 6 is a fragmentary view similar to Fig. 4, but illustrates the parts in the position they assume when the clutch is engaged.

A shiftable actuating sleeve 54 is slidably mounted upon the hub portion 12 of the backing plate 13 and is locked against relative rotation with respect thereto by a key 55. This arrangement affords a more compact device by enabling the over all length of the clutch to be considerably shortened, compared to a construction in which the sleeve is not mounted on the hub. The over all length of the clutch is also shortened from three to six inches by utilizing the space at the center of the clutch for the levers 30 which are associated with the actuating sleeve 54, instead of having the actuating means outwardly of the center of the clutch and creating the necessity for a longer shaft in any given installation. The actuating sleeve 54 is provided with a curved or axially inclined cam surface 56 which is adapted to engage with the rollers 34 carried by the levers 30 in order to effect engagement of the clutch 3, as will be explained later. The actuating sleeve 54 carries a ridge 56x disposed between the rollers 34 and counterweights 37, for a purpose set forth hereinafter. The sleeve 54 also has a radially projecting flange 57 which is rotatably received in a groove 58 formed in a two-piece yoke 59 (Fig. 2), held together by bolts 60. The yoke 59 carries trunnions 61 which are mounted in arms 62 respectively secured to an operating shaft 63. A suitable lever 64 is connected to the shaft 63 for actuating the yoke 59 to shift the sleeve 54 axially on the hub 12 to manually effect engagement or disengagement of the clutch 3. Thus, upon movement of the actuating sleeve 54 axially, in a direction away from the backing plate 13, the cam surface 56 engages the rollers 34 carried by the levers 30 and causes rotation of said levers in a direction counterclockwise about their supporting pins 31. Such movement of the levers 30 causes the end portions 52 thereof to engage the surface 51 on the adjustment ring 49 to effect movement of the pressure plate 14 axially toward the backing plate 13, thereby causing such movement of the disc 40 on the sleeve 45 as may be necessary in order to effect mutual driving engagement between the friction elements 41 carried thereby and the backing plate 13 and the pressure plate 14. The parts then assume the position shown in Fig. 6.

Disengagement of the clutch 3 is effected by movement of the actuating sleeve 54 toward the backing plate 13. Such movement will release the rollers 34 from the cam surface 56 and the springs 42 will move the pressure plate 14 axially away from the backing plate 13 so that the disc 40 can rotate freely therebetween without imparting rotation thereto. The counterweight 37 carried by the levers 30 will normally maintain the same in such position that the rollers 34 hang in a position in slight pressural contacting engagement with the actuating sleeve 54, as illustrated in Fig. 4. The mass of the counterweight 37 is such that it overcomes any centrifugal force acting on the roller 34 tending to maintain the clutch parts engaged, whereby prompt release of the clutch parts can be effected regardless of the speed of rotation when the sleeve 54 is shifted to disengaging position. Furthermore, any tendency for the levers 30 to remain in the position shown in Fig. 6 would be mechanically frustrated by the ridge 56ˣ on the actuating sleeve 54 which, upon shifting of said sleeve toward the backing plate 13, will engage the counterweights 37 and effect positive release of said levers. However, normally, the levers 30 swing to their inactive position immediately upon retraction of the sleeve 54. Another purpose of the ridge 56ˣ is to limit the movement of the sleeve 54 in a direction away from the backing plate 13.

Wear on the engaging surfaces of the clutch 3 can be compensated for by suitable adjustment of the wear take-up ring 49. To facilitate rotation of the ring 49, a plurality of circumferentially spaced notches 65 are formed therein. These notches may be engaged by a suitable wrench or other means to effect turning of said ring relative to the pressure plate 14.

The present clutch construction includes means for locking the wear take-up ring 49 in any desired position of adjustment. To this end, the flange 47 on the pressure plate 14 is provided with a counter-bore 66 (see Fig. 7) to receive a compression spring 67 and a plunger 68 which is recessed at 69 to receive one end of said spring. The outer end of the plunger 68 is reduced in diameter as indicated at 70 and 70ᵃ for cooperation with a ball detent 71 which is introduced through an opening 72 and received in a recess 73, both extending transversely to the bore 66. The threads 50 on the adjustment ring 49 are cut away at circumferentially spaced points to provide a series of outwardly flared notches 74 adapted to receive the ball detent 71 to lock the ring 49 against rotation.

As will be apparent from Fig. 7, when the detent 71 is engaged in the notch 74, the reduced portion 70ᵃ of the plunger 68 retains said ball detent 71 against displacement and thus locks the ring 49 in place. At the same time, the detent 71 prevents the spring 67 from pushing the plunger 68 out of the bore 66. When it is desired to adjust the ring 49, the plunger 68 is depressed to the position shown in Fig. 8, wherein the reduced portion 70 of the plunger 68 is aligned with the detent 71 so that upon rotation of said ring said detent can be readily displaced radially by the flared sides of the notches 74 and said ring adjusted to the extent desired. The detent 71 is allowed to seat in the notch 74 aligned therewith, so that upon release of said plunger the portion 70ᵃ thereof will become aligned with the ball detent 71 and the ring 49 will again be locked positively against inadvertent rotation.

The actuating sleeve 54 is lubricated for easy sliding movement upon the hub portion 12 through a fitting 76, and the flange 57 on said sleeve is lubricated through a fitting 78 mounted in the trunnion 61 so that wear between the yoke 59 and said flange can be reduced to a minimum.

Figure 9:
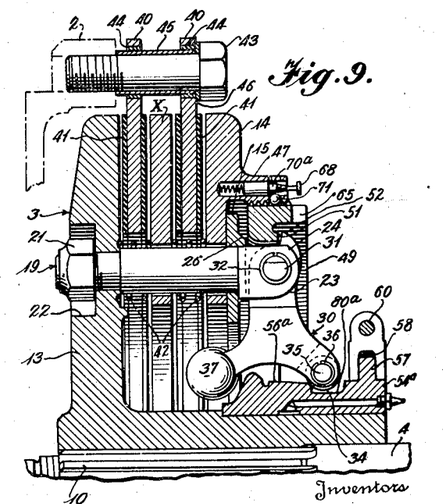
Fig. 9 is a fragmentary sectional view illustrating a modified clutch construction including means for effecting quick-release and quick-engagement of the clutch parts.

Fig. 9 illustrates a form of clutch including two discs 40 instead of the single disc shown in Fig. 4, with a spacer disc X therebetween; thus, generally indicating the manner in which a clutch embodying a plurality of discs may be constructed in accordance with the principles of the present invention. In addition, Fig. 9 illustrates a modified actuating sleeve 54ᵃ in which a cam surface 56ᵃ is modified to reduce the axial force necessary to engage the clutch and merges abruptly into a shallow groove 80ᵃ, so that the levers 30 can be actuated to quickly release the pressure plate 14 when the sleeve 54ᵃ is moved toward the backing plate 13 and the rollers 34 ride inwardly into the groove 80ᵃ to thereby effect rapid disengagement of the clutch. Conversely, when the actuating sleeve 54ᵃ is moved axially away from the backing plate 13, the rollers 34 will ride outwardly over the edge of the groove 80ᵃ and the clutch can be quickly engaged. The slope of the cam surface 56ᵃ is slight, as shown, with the result that the pressure plate 14 is brought into engaging position when the rollers 34 go over the corner of the groove 80ᵃ and driving engagement is really effected by the pressure created as the rollers 34 are engaged by the cam surface 56ᵃ and forced outwardly. The low slope of the cam surface 56ᵃ makes it possible for a very great unit pressure to be established through the pressure plate 14 between the various friction surfaces of the clutch.

Figure 10:
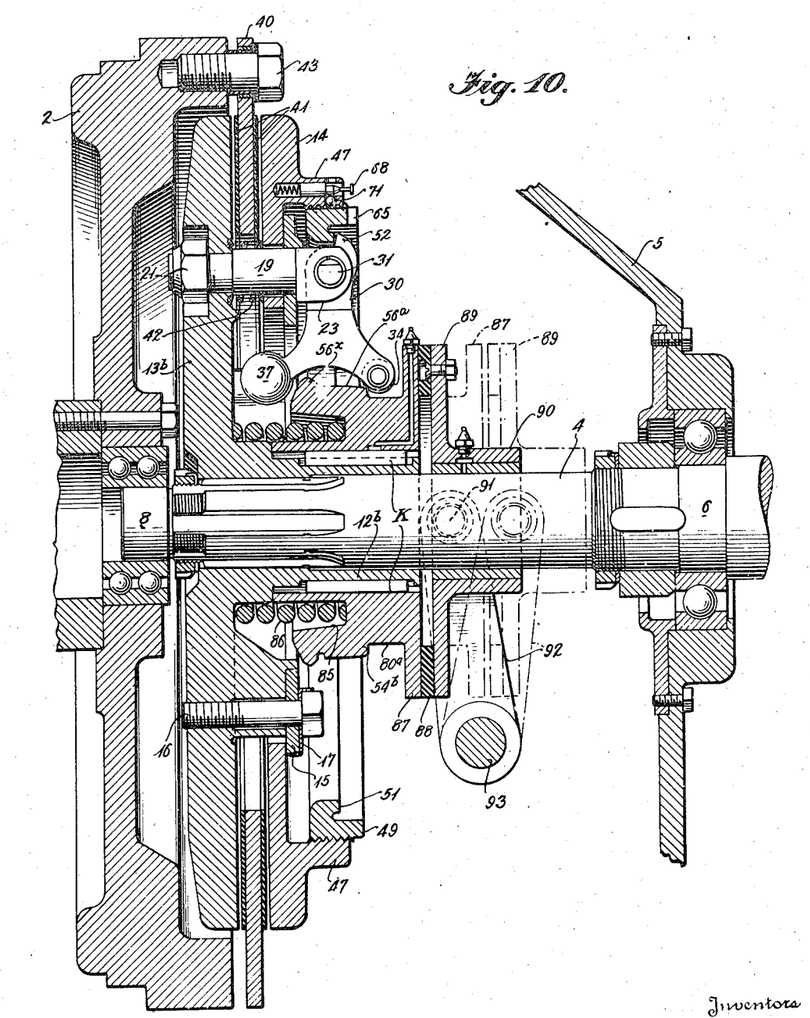
Fig. 10 is a vertical sectional view through still another form of clutch including a spring tending to maintain the clutch parts in driving engagement, and brake means associated therewith for simultaneously effecting disengagement of the clutch and stopping the rotation of the driven element thereof.
Figure 11:
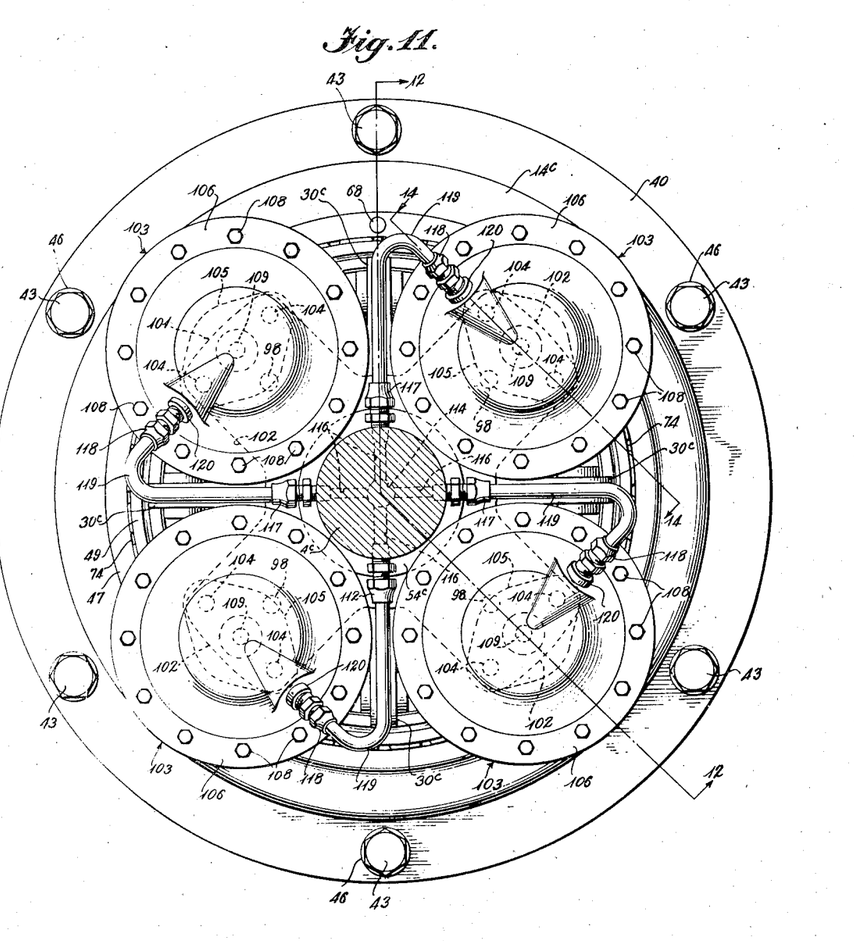
Fig. 11 is a face view of another form of clutch including a plurality of fluid pressure operable units for actuating a mechanism including four levers to effect engagement of the clutch elements.

Fig. 10 illustrates a clutch which combines certain features of the clutch construction shown in Figs. 4 and 9 and includes additional features. For the sake of convenience and brevity, the parts of Fig. 10 corresponding to those already described have been identified by the same reference numerals.

The principal difference between the structure shown in Fig. 10 and that heretofore described is that the actuating sleeve 54ᵇ is provided with an annular recess 85 adapted to receive one end of a compression spring 86, which surrounds a portion of the hub 12ᵇ and is arranged so that it continuously tends to urge said sleeve in an axial direction away from a backing plate 13ᵇ. Such action, of course, tends to engage the cam surface 56ᵃ with the rollers 34 carried by the levers 30 to thereby actuate said levers to effect pressural engagement of the pressure plate 14 and the backing plate 13ᵇ with the disc means 40 so that the clutch parts are normally in driving engagement. The sleeve 54ᵇ is slidably mounted upon the hub 12ᵇ and is prevented from turning relative thereto by two keys K. In order to effect disengagement of the clutch parts, the actuating sleeve 54ᵇ is manually (or otherwise) moved in a direction toward the backing plate 13ᵇ so that the rollers 34 are disengaged from the cam surface 56ᵃ and rest in the quick-releasing groove 80ᵃ. One way of effecting such movement manually comprises providing the sleeve 54ᵇ with a radial flange 87 which is engageable by a friction element 88 secured to a plate 89 having a bushed hub 90 slidably mounted upon the shaft 4. The hub 90 is provided with suitable trunnions 91 connected with a yoke 92 carried by an operating shaft 93. When the plate 89 is retracted to the position indicated by dot and dash lines, the spring 86 will move the flange 87 of the actuating sleeve 54ᵇ to the corresponding position shown by dot and dash lines to thereby effect driving engagement of the clutch parts in a manner which will be clear from the preceding description. The clutch will remain engaged until the plate 89 is moved toward the left, as viewed in Fig. 10, against the action of the spring 86, to release the levers 30 to permit disengagement of the clutch parts. Simultaneously, however, the friction element 88, in cooperation with the flange 87 of the sleeve 54ᵇ, will apply a braking force to said sleeve to quickly bring the rotating parts, including the backing plate 13ᵇ and the pressure plate 14, to a stop. Such stopping will necessarily interrupt the rotation of the shaft 4, so that any transmission gearing (not shown) associated with the shaft 4 can be shifted and engaged without clashing. Here again, while a single disc 40 has been shown between the backing plate 13ᵇ and the pressure plate 14, any suitable number of discs may be employed.

Figs. 11 to 14 illustrate another type of clutch utilizing levers for effecting engagement of the clutch parts, but wherein the levers, instead of being actuated manually, are actuated by fluid under pressure, either in the form of air under pressure or liquid under pressure. Here again, for convenience, parts corresponding to those already described are identified by the same reference numerals.

Figure 12:
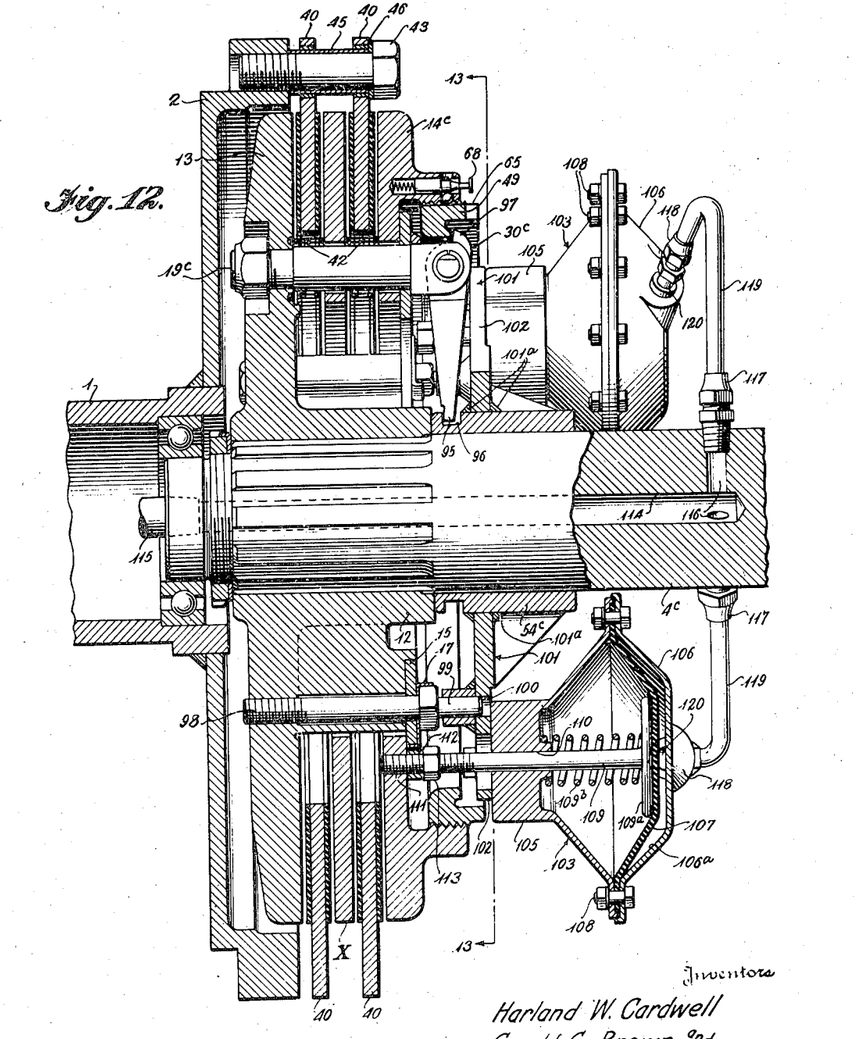
Fig. 12 is a vertical sectional view taken on the line 12—12 of Fig. 11 and particularly illustrating the manner in which the individual levers are pivotally supported relative to the backing plate.
Figure 13:
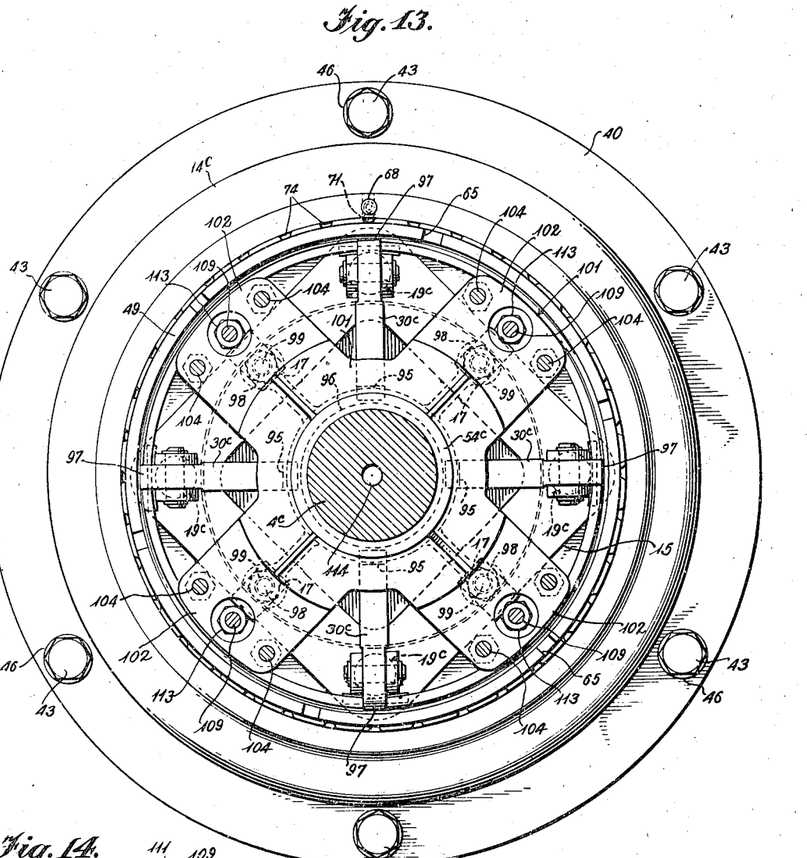
Fig. 13 is a sectional view taken on the line 13—13 of Fig. 12, particularly illustrating the X-shaped plate which supports the fluid pressure operable units.
Figure 14:
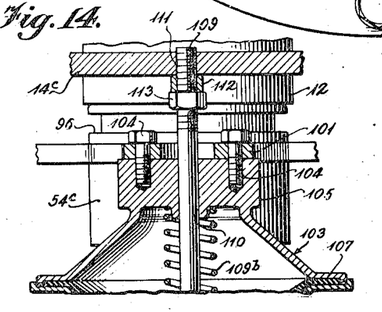
Fig. 14 is a sectional view taken on the line 14—14 of Fig. 11 illustrating the mounting means for one of the fluid pressure units.

It will be noted from Fig. 12 that a different form of lever 30ᶜ has been shown arranged so that its inner end 95 projects into a groove 96 formed in the periphery of an actuating sleeve 54ᶜ. The opposite end 97 of the lever 30ᶜ is pivotally mounted relative to an eye bolt 19ᶜ and cooperates with the adjustment ring 49 in the manner previously described.

It will also be noted that the cap screws 16 have been replaced by modified cap screws 98 having a stud 99 extending into an opening 100 formed in an X-shaped supporting plate 101, which is welded to the periphery of the actuating sleeve 54ᶜ, as indicated at 101ᵃ in Fig. 12. The supporting plate 101 is thus mounted for sliding movement on the studs 99, but is prevented by said studs from rotating relative to the backing plate 13. Each of the arms 102 of the supporting plate 101 has a fluid pressure operable unit 103 secured thereto by a pair of bolts 104 (Fig. 11) threaded into the base 105 thereof. Each of the units 103 includes a dished cover 106 and a diaphragm 107 disposed between the base 105 and said cover. A plurality of bolts 108 extend through the cover 106, diaphragm 107 and a flange on the base 105 to maintain the parts in assembled relation. A stem or rod 109 projects through an opening 110 in the base 105. One end of the stem 109 has a large head 109ᵃ which is urged into contact with the diaphragm 107 by a spring 109ᵇ. The other end of the stem 109 is threadedly mounted in an opening 111 formed in a pressure plate 14ᶜ. A spacer 112 of greater height than the thickness of the tie-plate 15 surrounds the stem 109 and a jam nut 113 threadedly mounted on the stem 109 is jammed against the spacer 112 to lock said stem against rotation relative to the pressure plate 14ᶜ.

The shaft 4ᶜ is provided with a longitudinal bore 114 having a tube 115 mounted in one end thereof adapted to be connected with a source of air or fluid under pressure. The axial passageway 114 communicates with four radial passageways 116, each of which is connected by fittings 117, 118, and a section of tubing 119 to an inlet 120 provided in the cover 106 of the unit 103.

The backing plate 13, the intermediate plate X, and the pressure plate 14ᶜ are, of course, free from engagement with the discs 40 when the clutch is disengaged. When it is desired to impart a drive to or from the flywheel 2 to the shaft 4ᶜ, fluid under pressure is admitted into the axial passageway 114 by suitable control means (not shown) and this fluid is distributed through the radial passageways 116 to the chamber 106ᵃ of each of the diaphragm containing units 103. Thus, it will be apparent that when fluid under pressure is admitted into the chambers 106ᵃ, the diaphragms 107 will be flexed toward the left, as viewed in Fig. 12, tending to move the rod 109 in the same direction. However, since the rod 109 is fixed to the pressure plate 14ᶜ, no movement of said rod relative to said pressure plate takes place, but on the other hand, a reaction occurs which causes movement of the base 105 of the unit 103 toward the right or in a direction away from the pressure plate 14ᶜ, carrying the cross-shaped supporting plate 101 and the actuating sleeve 54ᶜ therewith. Movement of the sleeve 54ᶜ away from the hub portion 12 of the backing plate 13 causes turning of the levers 30ᶜ in a counter-clockwise direction by virtue of the fact that the ends 95 of said levers are engaged in the groove 96 of said sleeve. Such movement of the levers 30ᶜ results in the application of force to the adjustment ring 49 by the ends 97 of said levers with the result that the pressure plate 14ᶜ is moved toward the left, as viewed in Fig. 12, and effects pressural engagement between the backing plate 13, the intermediate plate X and the pressure plate 14ᶜ with the clutch discs 40 so that a drive is then transmitted to or from the flywheel 2 through the engaged clutch elements from or to the shaft 4ᶜ.

When it is desired to disengage the clutch, the fluid under pressure is exhausted from the units 103 and the springs 42 restore the pressure plate 14ᶜ, intermediate plate X, and backing plate 13 to their initial positions free from engagement with the clutch discs 40. It will be understood that the use of fluid pressure to actuate this form of clutch makes it possible to control the clutch from a remote point. Wear on the engaging surfaces of the clutch parts may be compensated for by adjustment of the ring 49, as in the previously described clutch constructions.

Figure 15:
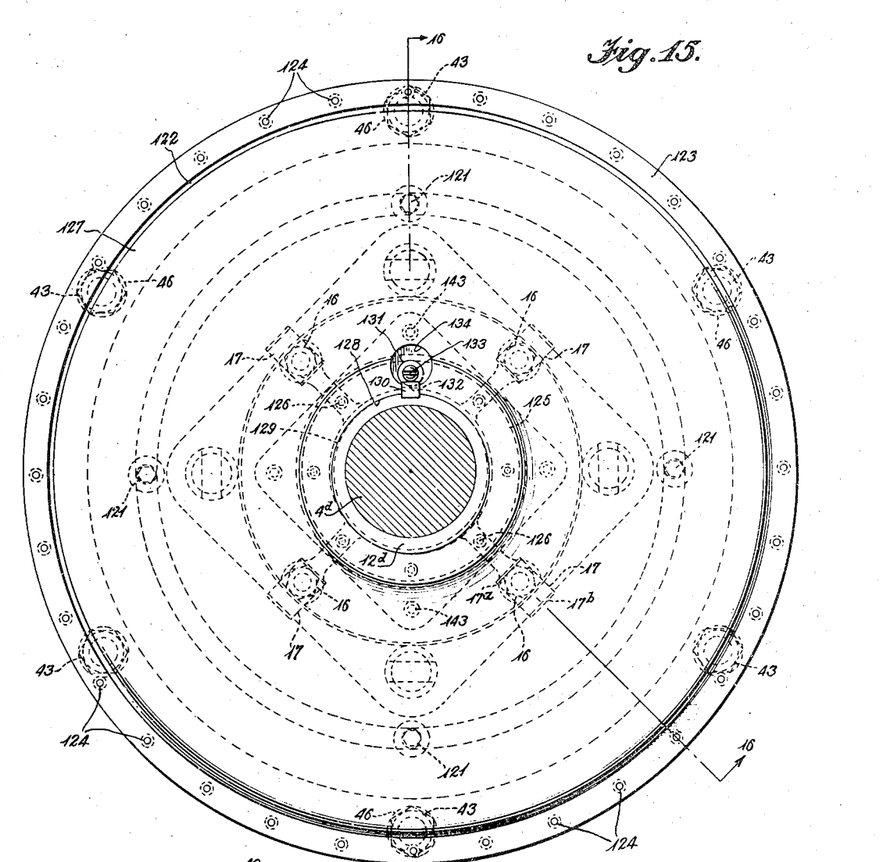
Fig. 15 is an elevational view of a somewhat simpler form of clutch arranged to be actuated by fluid under pressure.
Figures 16, 18, 19:
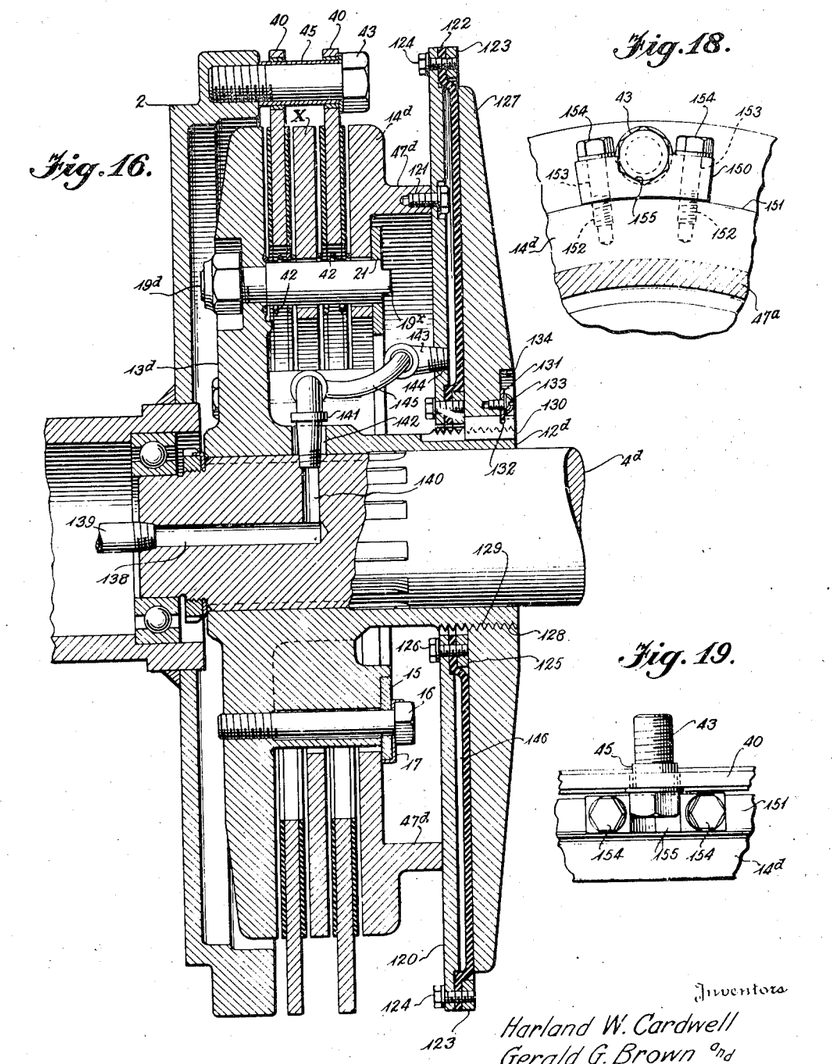
Fig. 16 is a vertical sectional view through the clutch taken on the line 16—16 of Fig. 15.
Figs. 17, 18 and 19 are detail views of an attachment that may be applied to any one of the several fluid operated clutches disclosed herein to effect a positive drive in the event of fluid pressure failure.

Figs. 15 and 16 illustrate another form of fluid-operated clutch in which a pressure plate 14ᵈ is supported upon modified headless bolts 19ᵈ having a ridge 19ˣ engageable by a wrench. The pressure plate 14ᵈ is adapted to be directly actuated by fluid under pressure to effect operative engagement of the clutch parts, instead of using a lever system as in the previously described forms of manually and fluid-operated clutches. As will be clear from Fig. 16, a centrally apertured plate 120 is passed over a hub 12$^d$ formed integral with a backing plate 13$^d$. The plate 120 is secured to a flange 47$^d$ on the pressure plate 14$^d$ by a suitable number of bolts 121. An annular diaphragm 122 overlies one face of the plate 120 and is secured thereto at its outer margin by a ring 123 and a series of bolts 124 extending through said plate and diaphragm and threaded into said ring. Similarly, the inner periphery of the diaphragm 122 is secured to the plate 120 by a ring 125 and a series of bolts 126 extending through said plate and diaphragm and threaded into said ring. The diaphragm 122 is backed up by a disc 127 which is provided with a threaded central opening 128 adapted to cooperate with threads 129 formed on the periphery of the hub 12$^d$. The disc 127 is prevented from rotating on the hub 12$^d$ by a key 130 seated in cooperating keyways in said disc and hub. The key 130 is locked against inadvertent displacement by a washer 131 which projects into a transverse slot 132 formed in said key, and a screw 133 which clamps said washer against movement in a recess 134 counter-bored in said disc.

The hub portion 12$^d$ of the backing plate 13$^d$ is splined or otherwise suitably fixed to a shaft 4$^d$. The shaft 4$^d$ has an axial passageway 138 connected at one end thereof with a tube 139. A radial passageway 140 communicates with the axial passageway 138. A conventional fitting 141 is mounted in the outer end of the passageway 140, said fitting having a portion extending through an opening 142 formed in the hub 12$^d$. A similar fitting 143 is mounted in an opening 144 formed in the plate 120 and a section of hose 145 interconnects the fittings 141 and 143, whereby to establish communication between the axial passageway 138 in the shaft 4$^d$ and a pressure chamber 146 formed between the adjacent faces of the plate 120 and the diaphragm 122.

It will be apparent that when fluid under pressure (either air or liquid) is admitted through the tube 139, by suitable control means (not shown) the diaphragm 142 will tend to bulge in a direction toward the right, as viewed in Fig. 16, and since the backing disc 127 is fixed to the hub 12$^d$, a resultant movement of the pressure plate 14$^d$ toward the left takes place. Such movement of the pressure plate 14$^d$ pressurally engages the backing plate 13$^d$, the intermediate plate X and the pressure plate 14$^d$ with the clutch discs 40 so that a drive is transmitted to or from the flywheel 2 through the clutch elements from or to the shaft 4$^d$. Disengagement of the clutch, of course, can be effected by relieving the pressure in the diaphragm chamber 146, whereupon the springs 42 will function to release the elements 13$^d$, X, and 14$^d$ from the clutch discs 40. Here again, the clutch can be controlled from a remote point. Any wear which occurs on the engaging face of the clutch elements can be compensated for by removing the key 130 and turning the disc 127 in a direction to move the same closer to the backing plate 13$^d$. After the desired adjustment has been made, the key 130 is replaced and locked in position by the washer 131 and screw 133. If it is desired to adjust the disc 127 through a fraction of a turn, additional keyways may be formed in the hub 12$^d$ so that said disc can be adjusted for a half or even a quarter turn if such minute degree of adjustment is desired.

Figure 17:
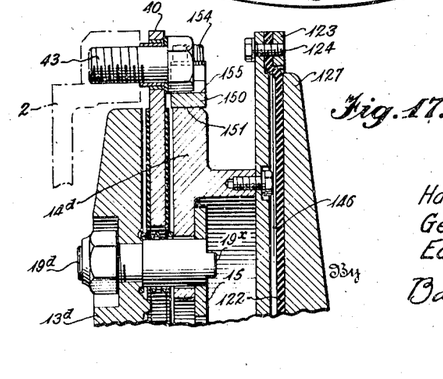

Figs. 17, 18 and 19 illustrate an attachment that may be used with any one of the forms of fluid operated clutch shown in Figs. 11 to 16 to effect a positive drive in the event of the failure of the supply of fluid under pressure, and with any one of the forms of manually operated clutches shown in Figs. 1 to 10 in the event of failure of the clutch actuating devices associated therewith. The attachment comprises an arcuate block 150 adapted to seat upon the periphery 151 of the pressure plate 14$^d$, for example. The pressure plate is provided with a pair of threaded openings 152 and the block 150 is provided with openings 153 in radial alignment therewith. Bolts 154 extend through the openings 153 and are threaded into the holes 152 to secure the block 150 to the pressure plate 14$^d$. The block 150 is provided with a notch 155 having a shape complemental to that of the head of the bolt 43.

In mounting the block 150 upon the periphery 151 of the pressure plate 14$^d$, the block is first positioned so that the notch thereof engages the head of one of the bolts 43 and then the pressure plate 14$^d$ is turned until the holes 152 therein line up with the openings 153 in the block. Then the bolts 154 are tightened in the holes 152 and the pressure plate 14$^d$ is positively locked against rotation relative to the flywheel 2 so that a positive driving connection is established between the two.

While certain specific structural arrangements of parts have been shown for carrying out the principles of the present invention, it will be understood that various changes may be made in the shape, construction and arrangement of the parts without departing from the spirit of the invention or the scope of the annexed claims.

We claim:

1. A clutch comprising: a backing plate having a hub adapted to be mounted upon a shaft; a pressure plate; clutch disc means between said backing and pressure plates; a plurality of bolts mounted at one end thereof upon said backing plate, said bolts extending through said pressure plate and supporting said pressure plate for axial movement relative to said backing plate; spring means interposed between said backing and pressure plates normally urging said backing and pressure plates apart; a tie-plate; means securing said tie-plate to said backing plate, said tie-plate being arranged to serve as a support for the opposite end of said bolts; and means for moving said pressure plate toward said backing plate to effect driving engagement with said clutch disc means.

2. A clutch comprising: a backing plate having a hub adapted to be mounted upon a shaft; a pressure plate; clutch disc means between said backing and pressure plates; a plurality of bolts mounted upon said backing plate, said bolts extending through said pressure plate and supporting said pressure plate for axial movement relative to said backing plate; spring means carried by each of said bolts interposed between said backing and pressure plates normally urging said backing and pressure plates apart; a plurality of bosses on said backing plate; a tie-plate engaged with said bosses, said pressure plate supporting bolts extending through said tie plate; and mean clamping said tie-plate against said bosses of said backing plate, said tie-plate being arranged to serve as a support for said pressure plate supporting bolts; and means for moving said pressure plate toward said backing plate to effect driving engagement with said clutch disc means.

3. A clutch comprising: a backing plate having a central hub adapted to be mounted upon a shaft; a pressure plate; clutch disc means between said backing and pressure plates; a plurality of levers pivotally mounted relative to said backing plate arranged to effect movement of said pressure plate toward said backing plate; a sleeve cooperable with said levers to actuate said levers to effect pressural engagement of said backing and said pressure plates with said clutch disc means; means normally urging said backing and pressure plates apart; and means mounted upon said backing plate and spaced from said central hub arranged to serve as a stop to limit the movement of said pressure plate away from said backing plate.

4. A clutch comprising: a backing plate having a central hub adapted to be mounted upon a shaft; an annular pressure plate axially movable relative to said backing plate; at least one clutch disc between said backing and pressure plates; a plurality of bolts carried by said backing plate; a lever pivotally carried by each of said bolts; a tie-plate supporting said bolts adjacent said levers; means on said pressure plate engageable by one end of said levers; and an actuating sleeve slidably mounted relative to said backing plate, said actuating sleeve having a portion cooperable with the opposite end of said levers to effect movement of said levers about their respective pivots to cause axial movement of said pressure plate toward said backing plate.

5. A clutch comprising: a backing plate having a central hub adapted to be mounted upon a shaft; an annular pressure plate axially movable relative to said backing plate; at least one clutch disc between said backing and pressure plates; a plurality of bolts carried by said backing plate; a lever pivotally carried by each of said bolts; a tie-plate supporting said bolts adjacent said levers; means on said pressure plate engageable by one end of said levers; and an actuating sleeve slidably mounted relative to said backing plate, said actuating sleeve having an inclined cam surface cooperable with the opposite end of said levers to effect movement of said levers about their respective pivots to cause axial movement of said pressure plate toward said backing plate.

6. A clutch comprising: a backing plate having a central hub adapted to be mounted upon a shaft; an annular pressure plate axially movable relative to said backing plate; at least one clutch disc between said backing and pressure plates; means yieldably urging said backing and pressure plates apart; a plurality of bolts carried by said backing plate; a lever pivotally carried by each of said bolts; a surface on said pressure plate engageable by one end of said levers; and an actuating sleeve slidably mounted relative to said backing plate, said actuating sleeve having an inclined surface cooperable with the opposite end of said levers to effect movement of said levers about their respective pivots to cause axial movement of said pressure plate toward said backing plate, said actuating sleeve also having a groove adjacent the low portion of said inclined surface to effect quick release or quick actuation of said pressure plate depending upon the direction of movement of said actuating sleeve.

7. A clutch comprising: a backing plate having a central hub adapted to be mounted upon a shaft; an annular pressure plate axially movable relative to said backing plate; at least one clutch disc betwen said backing and pressure plates; a plurality of bolts carried by said backing plate; a lever pivotally carried by each of said bolts; a tie-plate supporting said bolts adjacent said levers; means on said pressure plate engageable by one end of said levers; and an actuating sleeve slidably mounted relative to said backing plate, said actuating sleeve having a groove receiving the opposite end of said levers, whereby to effect turning of said levers about their respective pivots to cause axial movement of said pressure plate toward said backing plate upon shifting of said actuating sleeve.

8. A clutch comprising: a backing plate having a hub adapted to be mounted upon a shaft; an annular pressure plate; a plurality of bolts carried by said backing plate and supporting said pressure plate for axial movement relative to said backing plate; at least one clutch disc between said backing and pressure plates; a lever pivotally mounted upon one end of each of said bolts; a tie-plate interconnecting said bolts adjacent said levers; means carried by said pressure plate arranged to be engaged by one end of said levers; a roller carried by the opposite end of each of said levers; and an actuating sleeve slidable upon the hub of said backing plate, said actuating sleeve having a cam surface cooperable with said rollers to effect movement of said levers about their respective pivots to move said pressure plate toward said backing plate.

9. A clutch comprising: a backing plate having a hub adapted to be mounted upon a shaft; an annular pressure plate; a plurality of bolts carried by said backing plate and supporting said pressure plate for axial movement relative to said backing plate; at least one clutch disc between said backing and pressure plates; a lever pivotally mounted upon one end of each of said bolts; means carried by said pressure plate arranged to be engaged by one end of said levers; a roller carried by the opposite end of each of said levers; an actuating sleeve slidable upon the hub of said backing plate, said actuating sleeve having a cam surface cooperable with said rollers to effect movement of said levers about their respective pivots to move said pressure plate toward said backing plate; spring means carried by each of said bolts interposed between said backing and pressure plates normally urging said backing and pressure plates apart; and a tie-plate mounted upon said backing plate arranged to serve as a support for said bolts.

10. A clutch comprising: a backing plate adapted to be mounted upon a shaft; an annular pressure plate; a plurality of bolts carried by said backing plate and supporting said pressure plate for axial sliding movement relative to said backing plate; at least one clutch disc between said backing and pressure plates; a lever pivotally carried by each of said bolts; adjustable wear take-up means carried by said pressure plate arranged to be engaged by one end of said levers; a roller carried by the opposite end of each of said levers; and a shiftable actuating sleeve slidable relative to said backing plate, said actuating sleeve having an inclined cam surface cooperable with said rollers upon shifting of said actuating sleeve in one direction to effect movement of said levers about their respective pivots to move said pressure plate toward said backing plate, said actuating sleeve also having a shallow groove adjacent the low side of said cam surface for effecting quick release or application of said levers upon shifting of said actuating sleeve in the opposite direction.

11. A clutch comprising: a backing plate adapted to be mounted upon a shaft; an annular pressure plate; a plurality of bolts carried by said backing plate and supporting said pressure plate for axial movement relative to said backing plate; at least one clutch disc between said backing and pressure plates; a lever pivotally carried by each of said bolts; tie-plate means supporting said bolts adjacent said levers; an adjustable wear take-up ring carried by said pressure plate arranged to be engaged by one end of said levers; and an actuating sleeve shiftable relative to said backing plate, said actuating sleeve having a portion cooperable with the opposite end of said levers to effect movement of said levers about their respective pivots to move said pressure plate toward said backing plate.

12. A clutch comprising: a backing plate having a hub adapted to be mounted upon a shaft; an annular pressure plate; a plurality of bolts carried by said backing plate and supporting said pressure plate for axial sliding movement relative to said backing plate; at least one clutch disc between said backing and pressure plates; a lever pivotally mounted upon one end of each of said bolts; means carried by said pressure plate arranged to be engaged by one end of said levers; an actuating sleeve slidable upon the hub of said backing plate, said actuating sleeve having a groove cooperable with the opposite end of said levers to effect movement of said levers about their respective pivots to move said pressure plate toward said backing plate; spring means carried by each of said bolts interposed between said backing and pressure plates normally urging said backing and pressure plates apart; and a tie-plate mounted upon said backing plate arranged to serve as a support for said bolts and also as a stop to limit the movement of said pressure plate away from said backing plate.

13. A clutch comprising: a backing plate having a central hub adapted to be mounted upon a shaft; an annular pressure plate; a plurality of bolts carried by said backing plate and supporting said pressure plate for axial movement relative to said backing plate; torque transmitting disc means between said backing and pressure plates; a lever pivotally carried by the head of each of said bolts; tie-plate means supporting said bolts adjacent the heads thereof; means on said pressure plate arranged to be engaged by one end of said levers; an actuating sleeve movable relative to said backing plate, said actuating sleeve having a portion cooperable with the opposite end of said levers to effect movement of said levers about their respective pivots to cause pressural engagement of said backing and pressure plates with said disc means; a compression spring arranged so that it normally tends to move said actuating sleeve in an axial direction away from said backing plate to thereby continuously maintain the backing and pressure plates in engagement with said disc means; and means for moving said actuating sleeve in an axial direction toward said backing plate to effect disengagement of said backing and pressure plates from said disc means.

14. A clutch comprising: a backing plate having a central hub adapted to be mounted upon a shaft; an annular pressure plate; clutch disc means between said backing and pressure plates; a plurality of bolts carried by said backing plate; a lever pivotally carried by each of said bolts; means on said pressure plate arranged to be engaged by one end of said levers; rollers carried by the opposite end of said levers; a shiftable actuating sleeve slidably mounted upon the hub of said backing plate, said actuating sleeve having an inclined surface cooperable with said rollers upon shifting of said actuating sleeve in one direction to effect movement of said levers about their respective pivots to cause pressural engagement of said backing and pressure plates with said clutch disc means; a compression spring surrounding the hub of said backing plate normally tending to move said actuating sleeve in said one direction and thereby continuously tend to maintain the backing and pressure plates in torque transmitting engagement with said disc means; and brake means engageable with said actuating sleeve for simultaneously moving said actuating sleeve in an axial direction toward said backing plate to effect disengagement of said backing and pressure plates from said clutch disc means and to retard rotation of said backing and pressure plates.

15. A clutch comprising: a backing plate having a central hub adapted to be mounted upon a shaft; a pressure plate movable axially relative to said backing plate; at least one clutch disc between said backing and pressure plates; a plurality of levers pivotally mounted upon said backing plate; means on said pressure plate engageable by one end of said lever; an actuating sleeve shiftable relative to said backing plate, said actuating sleeve having means cooperatively engageable with the opposite end of said levers; and means for effecting shifting of said actuating sleeve including a supporting plate secured to said actuating sleeve; a plurality of fluid pressure operable devices fixedly mounted upon said supporting plate, each of said devices including a diaphragm operatively connected by a rod with said pressure plate, and means for simultaneously introducing operating fluid under pressure into said plurality of fluid pressure operable devices.

16. A clutch comprising: a backing plate having a central hub adapted to be mounted upon a shaft; a pressure plate movable axially relative to said backing plate; at least one clutch disc between said backing and pressure plates; a plurality of bolts carried by said backing plate; a lever pivotally carried by each of said bolts; means on said pressure plate engageable by one end of said levers; spring means interposed between said backing and pressure plates normally urging said backing and pressure plates apart; a tie-plate; a plurality of cap screws securing said tie-plate to said backing plate, said tie-plate being arranged to serve as a stop to limit the movement of said pressure plate away from said backing plate and to also serve as a support for said first-mentioned bolts; an actuating sleeve shiftable relative to said backing plate, said actuating sleeve having a groove receiving the opposite end of said levers; and means for effecting shifting of said actuating sleeve including, a supporting plate secured to said actuating sleeve, a plurality of fluid pressure operable devices fixedly mounted upon said supporting plate, each of said devices including a diaphragm operatively connected by a rod with said pressure plate, and means for introducing operating fluid under pressure into said fluid pressure operable devices, whereby to effect shifting of said actuating sleeve axially in a direction away from said backing plate to effect turning of said levers about their respective pivots and thus move said pressure plate toward said backing plate to provide a driving connection with said clutch disc.

17. A clutch comprising: a backing plate having a hub adapted to be mounted upon a shaft; a pressure plate; clutch disc means between said backing and pressure plates; means supporting said pressure plate for axial movement relative to said backing plate; spring means interposed between said backing and pressure plates normally urging said backing and pressure plates apart; means to limit the movement of said pressure plate away from said backing plate; and means for moving said pressure plate toward said backing plate including: an annular plate adjacent to and cooperable with said pressure plate, an annular diaphragm clamped to and overlying one side of said annular plate, and a backing disc mounted upon said hub adjacent the outer side of said diaphragm; and means for introducing operating fluid under pressure between said annular plate and said diaphragm.

18. A clutch comprising: a backing plate having a hub adapted to be mounted upon a shaft, said hub being externally threaded; a pressure plate; clutch disc means between said backing and pressure plates; a plurality of bolts mounted upon said backing plate, said bolts extending through said pressure plate and supporting said pressure plate for axial movement relative to said backing plate; spring means interposed between said backing and pressure plates normally urging said backing and pressure plates apart; a plurality of bosses on said backing plate; a tie-plate engaged with said bosses; a plurality of cap screws clamping said tie-plate against said bosses, said tie-plate being arranged to serve as a support for said bolts; fluid pressure operable means for moving said pressure plate toward said backing plate including: an annular plate adjacent to and cooperable with said pressure plate, an annular diaphragm clamped to and overlying one side of said annular plate, an adjustable backing disc mounted upon the threads of said hub adjacent the outer side of said diaphragm; and means for introducing operating fluid under pressure between said annular plate and said diaphragm.

19. A clutch comprising: a driving element; clutch disc means; a plurality of bolts extending through said clutch disc means and securing the same to said driving element; driven means cooperating with said clutch disc means including a pressure plate and a backing plate, said pressure plate lying in a plane common to the heads of said bolts with the periphery of said pressure plate spaced inwardly from the heads of said bolts; means for normally actuating said pressure plate to effect driving engagement of said driven elements with said clutch disc; and means for effecting a positive drive between said driving element and said pressure plate in event of failure of said pressure plate actuating means.

20. A clutch comprising: a driving element; clutch disc means; a plurality of bolts extending through said clutch disc means and securing the same to said driving element; driven means cooperable with said clutch disc means including a pressure plate and a backing plate, said pressure plate lying in a plane common to the heads of said bolts with the periphery of said pressure plate spaced inwardly from the heads of said bolts; fluid pressure operable means for normally actuating said pressure plate to effect driving engagement of said driven elements with said clutch disc means; and an attachment including a block member having a recess to receive at least a portion of the head of one of said bolts, said block being adapted to be interposed between the periphery of said pressure plate and said bolt head and to be secured to the periphery of said pressure plate to effect a positive drive between said driving element and said pressure plate in the event of failure of supply of fluid under pressure; and means for securing said block to said pressure plate.

21. A clutch comprising: a backing plate having a central hub adapted to be mounted upon a shaft, an annular pressure plate movable axially relative to said backing plate; at least one clutch disc between said backing and pressure plates; a plurality of levers pivotally carried by said backing plate; an externally threaded wear take-up ring mounted on said pressure plate, said ring having a portion engageable by one end of said levers, the threaded portion of said ring being provided with a series of notches; means including a ball detent cooperable with said notches to lock said ring in adjusted position relative to said pressure plate; an actuating sleeve shiftable relative to said backing plate, said actuating sleeve having a portion cooperable with the opposite end of said levers; and means for effecting shifting of said actuating sleeve to thereby rotate said levers about their pivots to move said pressure plate toward said backing plate.

22. A clutch comprising: a backing plate; a pressure plate; clutch disc means between said backing and pressure plates; means including pivotally mounted levers arranged to move said pressure plate axially toward said backing plate; a shiftable actuating sleeve, said sleeve having an inclined surface cooperable with said levers upon shifting of said actuating sleeve in one direction to effect movement of said levers about their respective pivots to cause pressural engagement of said backing and pressure plates with said clutch disc means; and brake means engageable with said actuating sleeve for simultaneously moving said actuating sleeve in an axial direction toward said backing plate to effect disengagement with said backing and pressure plates from said clutch disc means and to retard rotation of said backing and pressure plates.

23. A clutch comprising: a backing plate adapted to be mounted upon a shaft; a pressure plate movable axially relative to said backing plate; at least one clutch disc between said backing and pressure plates; means including pivotally mounted levers arranged to move said pressure plate axially toward said backing plate; spring means interposed between said backing and pressure plates normally urging said backing and pressure plates apart; an actuating sleeve shiftable relative to said backing plate, said actuating sleeve having means cooperable with said levers for actuating the same; and means for effecting shifting of said actuating sleeve including, a supporting plate secured to said actuating sleeve, at least one fluid pressure operable device fixedly mounted upon said supporting plate, said device including a diaphragm operatively connected with said pressure plate, and means for introducing operating fluid under pressure into said fluid pressure operable device, whereby to effect shifting of said actuating sleeve axially in a direction away from said backing plate to effect turning of said levers about their respective pivots and thus move said pressure plate toward said backing plate to provide a driving connection with said clutch disc.

24. A clutch comprising: a backing plate adapted to be mounted upon a shaft; a pressure plate; friction means between said backing and pressure plates; studs mounted upon and supported by said backing plate, said studs slidably supporting said pressure plate for axial movement relative to said backing plate; means normally urging said backing and pressure plates apart; a backing disc disposed outwardly of said pressure plate; and fluid pressure operable means operatively disposed between said backing disc and pressure plate arranged to effect movement of said pressure plate toward said backing plate.

25. A clutch comprising: a backing plate; a pressure plate; at least one annular friction element disposed between said backing and pressure plates; means supporting said pressure plate for axial movement relative to said backing plate; means normally urging said backing and pressure plates apart; an annular member adjacent to and cooperable with said pressure plate; a disc member disposed outwardly of said annular member; a diaphragm disposed between said annular member and said disc member, said diaphragm having a side surface area substantially greater than the surface area of one side of said annular friction element; and means for introducing operating fluid under pressure between said diaphragm and one of said members to cause movement of said pressure plate toward said backing plate.

26. A clutch comprising: a backing plate having an elongated hub portion adapted to be mounted upon a shaft; a pressure plate; clutch disc means between said backing and pressure plates; studs slidably supporting said pressure plate for axial movement relative to said backing plate; means normally urging said backing and pressure plates apart; and fluid pressure operable means including a backing disc axially spaced from said backing plate and mounted upon said elongated hub portion and arranged to effect movement of said pressure plate toward said backing plate.

27. A clutch comprising: a backing plate adapted to be mounted upon a shaft; a pressure plate; clutch disc means between said backing and pressure plates; means normally urging said backing and pressure plates apart; a plurality of levers pivotally mounted relative to said backing plate arranged to effect movement of said pressure plate toward said backing plate; a sleeve cooperable with said levers to actuate said levers to effect pressural engagement of said backing and pressure plates with said clutch disc means upon movement of said sleeve in a direction away from said backing plate; and a counterweight on each of said levers arranged to normally relieve the lever pressure on said pressure plate when said clutch is disengaged, whereby to minimize wear on said clutch disc means, said counterweights projecting into the path of movement of said sleeve and being engageable by said sleeve for positive actuation thereby to relieve the pressure on said pressure plate upon movement of said sleeve in a direction toward said backing plate to disengage said clutch.

28. A clutch as defined in claim 3, in which the lever actuating sleeve is disposed radially inwardly of the stop means and is slidably mounted on the central hub of the backing plate.

29. A clutch comprising: a backing plate; a pressure plate; at least one annular friction element disposed between said backing and pressure plates; means supporting said pressure plate for axial movement relative to said backing plate; means normally urging said backing and pressure plates apart; a first member constrained against axial movement with respect to said backing plate; a diaphragm disposed inwardly of said first member; a second member disposed between said diaphragm and said pressure plate and arranged to transmit diaphragm pressure to said pressure plate, said diaphragm having an effective side surface area substantially greater than the surface area of one side of said annular friction element; and means for introducing operating fluid under pressure between said diaphragm and said first member to cause movement of said pressure plate toward said backing plate.

30. A clutch comprising: a backing plate; a pressure plate; at least one annular friction element disposed between said backing and pressure plates; means supporting said pressure plate for axial movement relative to said backing plate; means normally urging said backing and pressure plates apart; an annular member; means maintaining said annular member spaced from said pressure plate; a disc member disposed outwardly of said annular member; a diaphragm disposed between said annular member and said disc member; and means for introducing operating fluid under pressure between said diaphragm and one of said members to cause movement of said pressure plate toward said backing plate.

31. A clutch comprising: a backing plate having a hub portion adapted to be mounted upon a shaft; a pressure plate; at least one annular friction element disposed between said backing and pressure plates; means supporting said pressure plate for axial movement relative to said backing plate; means normally urging said backing and pressure plates apart; a first member carried by said hub portion of said backing plate; a diaphragm disposed inwardly of said first member; a second member disposed between said diaphragm and said pressure plate; and means for introducing operating fluid under pressure between said diaphragm and one of said members to cause movement of said second member and said pressure plate toward said backing plate.

HARLAND W. CARDWELL.
GERALD G. BROWN.
EARL R. JOHNSON.

REFERENCES CITED

The following references are of record in the file of this patent:

UNITED STATES PATENTS

| Number | Name | Date |
|---|---|---|
| 1,053,163 | Dennis | Feb. 18, 1913 |
| 1,648,323 | Plaff | Nov. 8, 1927 |
| 1,655,169 | Taub | Jan. 3, 1928 |
| 1,690,698 | Pearmain | Nov. 6, 1928 |
| 1,782,880 | Pearmain | Nov. 25, 1930 |
| 1,787,160 | Mooorhouse | Dec. 30, 1930 |
| 1,828,423 | Loeffler | Oct. 20, 1931 |
| 1,879,569 | Snow, Jr. | Sept. 27, 1932 |
| 2,077,709 | Pearmain | Apr. 20, 1937 |
| 2,095,816 | Johansen | Apr. 20, 1937 |
| 2,199,523 | Kegresse | May 7, 1940 |
| 2,278,960 | Wilson | Apr. 7, 1942 |
| 2,333,003 | Greiner | Oct. 26, 1943 |
| 2,349,132 | Baird | May 16, 1944 |
| 2,370,360 | McLean et al. | Feb. 27, 1945 |